United States Patent [19]
Holden

[11] 3,992,494
[45] Nov. 16, 1976

[54] METHOD OF MAKING AN OXIDE FUEL COMPACT

[75] Inventor: Robert B. Holden, Scarsdale, N.Y.

[73] Assignee: General Atomic Company, San Diego, Calif.

[22] Filed: May 28, 1974

[21] Appl. No.: 473,481

[52] U.S. Cl. .............................. 264/.5; 252/301.1 R
[51] Int. Cl.² ......................................... G21C 21/12
[58] Field of Search ................. 264/.5; 252/301.1 R

[56] References Cited
UNITED STATES PATENTS

| | | | |
|---|---|---|---|
| 3,042,594 | 7/1962 | Hauth | 264/.5 X |
| 3,075,244 | 1/1963 | Glenn | 264/.5 X |
| 3,236,921 | 2/1966 | Sermon | 264/.5 |
| 3,404,201 | 10/1968 | Braun et al. | 264/.5 X |
| 3,799,882 | 3/1974 | Holland | 264/.5 X |
| 3,803,056 | 4/1974 | Hart | 264/.5 X |
| 3,823,067 | 7/1974 | Stern et al. | 264/.5 X |

Primary Examiner—Verlin R. Pendegrass
Assistant Examiner—Peter A. Nelson
Attorney, Agent, or Firm—Fitch, Even, Tabin & Luedeka

[57] ABSTRACT

A method of making an oxide nuclear fuel compact of predominantly open porosity having a density between about 88 and 96 percent of theoretical density. A green compact is formed from a mixture of particulate nuclear fuel oxide and fibrous material and then heated under conditions sufficient to cause removal of the fibrous material. Sintering for a sufficient length of time produces a strong, open-pore structure which is resistant to in-reactor sintering.

9 Claims, 3 Drawing Figures

METHOD OF MAKING AN OXIDE FUEL COMPACT

This invention relates to nuclear fuel and more particularly to methods of making porous nuclear fuel oxide compacts which are resistant to in-reactor sintering.

In order to accommodate the swelling which it is known that oxide nuclear fuel will experience during the course of its reactor lifetime, it has become common to fabricate such a fuel compact to a density which is significantly less than its theoretical density, e.g., in the range between about 88% and 96% of theoretical density, with densities in the range of about 90% to 95% of theoretical being typical. It has also been generally considered desirable that the porosity in such fuel pellets be in the form of closed pores because closed pores are less likely to absorb impurities, such as moisture, during the fabrication process. It has also been felt that fuel fabricated with closed pores would tend to retain a greater fraction of the gaseous fission products within the interstices of the fuel compact itself.

However, it has fairly recently been found that fuel compacts having closed pores, particularly pores of small size, tend to be eliminated early in the course of reactor service, leading to concomitant shrinkage which results in the creation of radial and/or axial gaps between the compacts or pellets and the fuel element cladding. Moreover, it has been found that the pressure differential between the exterior and the interior of such closed pores can also contribute to shrinkage throughout reactor service. As a result, it is now considered that porous nuclear fuel oxide compacts having relatively large, interconnected open pores will have desirable applications in power reactor service.

It is an object of the present invention to provide a method for making nuclear fuel compacts having interconnected open pores. It is another object of the invention to provide a method for making nuclear fuel oxide compacts having interconnected open pores, which compacts exhibit excellent resistance to in-reactor sintering. A further object of the invention is to provide an improved method for making uranium dioxide compacts having a density between about 88 percent and 96 percent of theoretical density which have relatively large interconnected pores.

Other objects of the invention will be apparent from the following description when read in conjunction with the accompanying drawings wherein.

Figure 1:
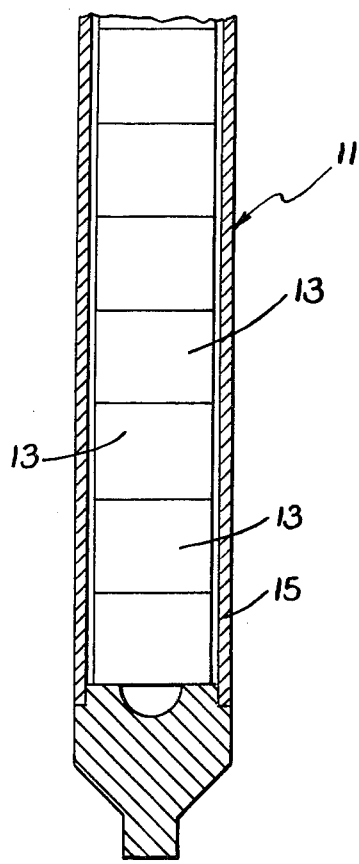
FIG. 1 is a fragmentary sectional view through a typical nuclear reactor fuel element incorporating compacts made in accordance with the present invention.

It has been found that oxide nuclear fuel compacts of a predominantly open porosity of a size which resists in-reactor sintering can be made by incorporating fibrous material into the material from which the green compact will be formed. Subsequently the green compact is heated under conditions which will cause the removal of the fibrous material, leaving as open passageways those regions wherein the fibrous material was originally present in the green compact. Thereafter, sintering is carried out under conditions which are sufficient to remove the majority of the very small pores which are inherently present in a body formed by compacting particulate material, leaving mainly only those larger pores which resulted from the removal of the fibrous material.

The fibers which are used may be made of any suitable material which is readily available and which can be readily removed at temperatures below the sintering temperature; organic fibers are particularly well suited for this purpose. Preferably, substantially complete removal of the fibrous material is effected at the usual dewaxing step. The fibers may be natural materials, such as cotton, cellulose, wool, and the like, or they may be synthetic fibers, such as nylon, polyesters, rayon, acetate, or any other appropriate materials which can be spun, extruded, or otherwise suitably formed into filaments or fibers. Carbon fibers might also be used; however, inasmuch as the purpose of the fibers is to be degraded and removed during the fuel fabrication process, less costly fibers would generally be chosen.

Fibers are generally defined as elongated objects having a length to thickness ratio of at least about 10 to 1, the thickness being the largest cross sectional dimension should the cross section be other than circular. Fibers having a diameter between about 5 microns and 2 mils may be employed to create the interconnected open pore structure in the resultant sintered fuel compact. Generally, the fibers which are used range between about 10 microns and about 40 microns in diameter. The length of the fibers is considered to be generally dependent upon the smallest dimension of the fuel compact being formed. The objective is to produce sintered compacts having an interconnected large pore structure which will be open to the surface and thus permit the release of the fission products and eliminate pressure differentials which might be otherwise created where closed pores are present. Not all of the fibers need reach the surface of the fuel compact because there will be interconnections between passageways as a result of the fibers crossing or otherwise touching one another in the green compact.

The length of the fibers if desirably in the range of about 5 to 10 percent of the smallest dimension of the fuel compact. For example, right circular cylindrical fuel compacts having a length-to-diameter ratio of greater than one may employ fibers having an average length in the range of about 5 to 10 percent of the diameter of the compact. Longer fibers may also be used, but in some instances they may lead to difficulties in the granulation and/or compaction steps. For this reason, in most instances, it is desirable to restrict the fiber length to no more than about 10 percent of the smallest dimension of the fuel compact.

The nuclear fuel material may be any fissionable and/or fertile oxides, such as uranium oxide, plutonium oxide, and thorium oxide. From a practical standpoint, fuel pellets of this open-pore type appear to have the greatest applicability in water-moderated reactors, e.g., boiling water reactors and pressurized water reactors. It is anticipated that the substantial advantages will lie in using fuel compacts of this type in the metal-clad fuel elements used in pressurized water reactors.

A fuel element 11 of this general type is illustrated in FIG. 1. The fuel element 11 generally comprises a large number of short cylindrical compacts 13 of sintered oxide fuel that are arranged in a stack, one atop another, within a fairly closely fitting outer cladding 15. The cladding 15 may be made of any suitable material, usually metal, which has good heat conduction properties and which is resistant to the high temperatures and irradiation which it will experience in the core of the nuclear reactor. Zircalloy is commony used for fuel element cladding for water reactors. In such reactors, the major portion of the nuclear fuel will generally be uranium oxide, particularly $UO_2$. Depending upon the characteristics of the particular reactor, its fuel may be a mixture of a major portion of uranium oxide with a minor portion of either plutonium oxide or thorium oxide. For example, it is common to make nuclear fuel compacts which are mainly uranium dioxide and include between about 5% and about 2% of plutonium dioxide.

Figure 3:
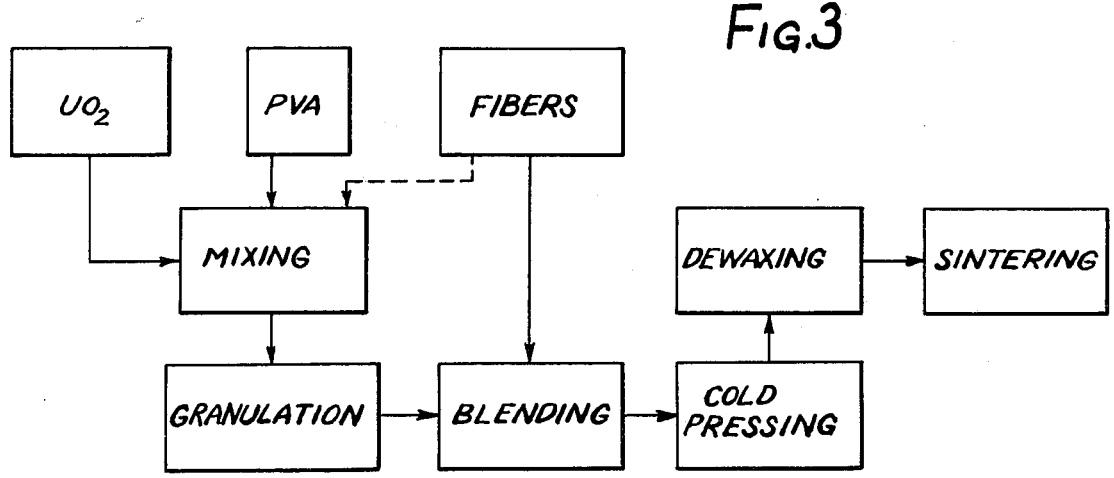
FIG. 3 is a block diagram illustrating the steps of a fuel compact fabrication method embodying various features of the present invention.

In general, the green compacts can be made using any of the well known methods presently used in the nuclear fuel industry, and a representative fabrication operation is diagrammatically illustrated in FIG. 3. To facilitate a production line process, it is common to first form granules from the oxide particles, and often a binder is included in the granulation procedure. For example, finely provided uranium dioxide powder may be mixed with a binder, such as polyvinyl alcohol (PVA), to create granules of the desired size range. Other suitable binders which may be employed include polyacrylic acid (PAA), polyethylene glycol and polymethacrylate esters. The fibers may be mixed with the powder in the granulation step; however, depending upon the sizes of the fibers and the granules employed, it may be preferable to mix the fibers with the granules just prior to the pressing operation which forms the green compacts. Generally, the granulation process is controlled so that granules having a size between about 150 microns and about 800 microns are formed; however, the granules may range up to 1200 microns in size.

The nuclear fuel mixture, which is the press feed for the green compacts, should contain a sufficient amount of fibers to provide the desired porosity in the final sintered fuel product. Inasmuch as some shrinkage will occur during the sintering process, the fibrous material is added in a volume percent somewhat greater than the volume percent porosity desired in the final product. For example, if the resultant fuel compacts are desired to have a porosity of about 8 percent (i.e., about 92 percent of theoretical density), about 10 volume percent of fibrous material and 90 volume percent of nuclear fuel oxide (exclusive of binder) might constitute the press feed from which the green compacts are formed. As a general rule, about 20 percent shrinkage in the large pores is anticipated under the fairly severe sintering conditions that are employed.

The pressure which is used in the formation of the green compacts is dependent somewhat upon whether or not a binder is employed in the granulation process. Usually, pressure greater than about 75 tons per square inch will not be used, and most likely pressing of the green compacts will be carried out using a pressure in the range between about 10 tons per square inch and about 40 tons per square inch.

Upon the conclusion of the pressing operation, the green compacts are ready for firing. Assuming that a binder is employed, as will usually be the case, a "dewaxing" step is preferably carried out to eliminate the binder prior to sintering, and in the present instance, the fibrous material will also be degraded and removed at essentially the same time. Dewaxing is generally carried out in the temperature range of about 500° C. to about 900° C. for a period in the neighborhood of two hours. It is common to carry out dewaxing in an atmosphere that is slightly oxidizing, for example, in a mixture of steam and hydrogen. Depending upon the particular fibrous material employed, a slightly longer time may be employed to assure that degradation and removal thereof is complete.

Figure 2:
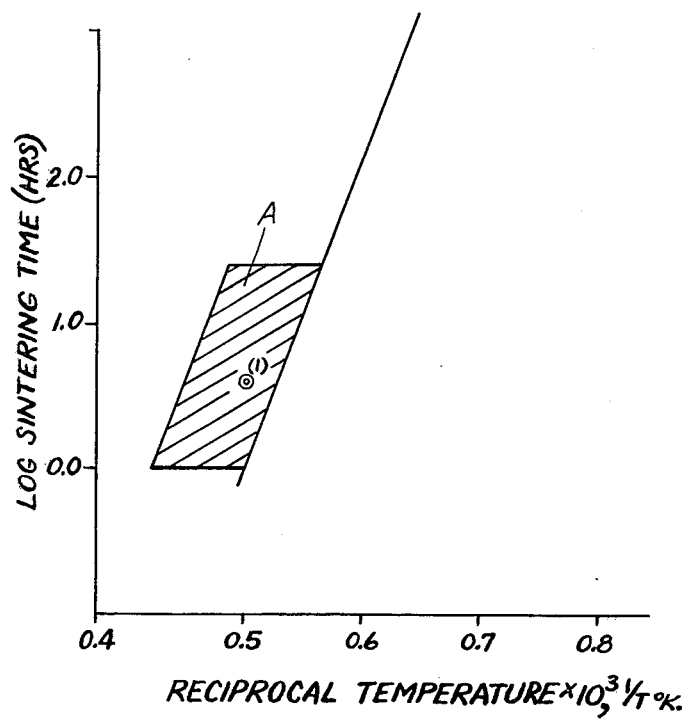
FIG. 2 is a graph depicting time-temperature conditions under which sintering should be performed in the production of nuclear fuel compacts in accordance with the teachings of the invention.

Subsequent to dewaxing, the compacts are sintered for a time-temperature interval sufficient to remove substantially all of the pores below about 3 microns in size. FIG. 2 is presented to illustrate time-temperature intervals which are considered to achieve the desired objective. The graph which constitutes FIG. 2 plots the time of sintering in hours (as its log to the base 10) against the reciprocal of the sintering temperature in degrees Kelvin times $10^3$. The region A is defined by the line which constitutes its right hand boundary and which includes the minimum timetemperature integrals felt to be effective. These intervals stretch from the lowermost point of 1 hour at about 1725° C. to 25 hours at about 1540° C. Of course, higher temperatures or longer times may be used, as long as the minimum is met, and generally sintering for more than one hour would be used. Although higher temperatures and sintering times longer than 25 hours could be employed, they are generally considered impractical from an economic standpoint.

It has been found that the preparation of green compacts having the fibrous material dispersed relatively uniformly therethroughout, followed by removal of the fibrous material and sintering, consistently produces compacts having pores of the desired range which are practically immune to in-reactor sintering and which remain interconnected throughout subsequent reactor life.

The following Example is provided as an illustration of one method which may be employed to produce nuclear fuel oxide compacts embodying various features of the invention. The block diagram presented as FIG. 3 is generally illustrative of the method of the Example.

EXAMPLE

Five kilograms of sinterable uranium dioxide powder having a specific surface area of about 2 square meters per gram are mixed with one weight percent of polyvinyl alcohol (PVA) that is dissolved in a suitable amount of water. A granulation procedure is carried out using the PVA-$UO_2$ mixture which is designed to prepare granules which are between about 150 microns and about 420 microns in size, and granules outside of this size range are returned to the procedure.

Approximately 50 grams of wood cellulose fibers, commerically sold as filter pulp and used as a filtering aid, are added to the granules and blended uniformly therewith. This amount of fibers constitutes about 9.9 volume percent, based upon total true volume of $UO_2$ plus fibers. The fibers have an average diameter of about 18 microns, and the major portion of them vary in length from about 0.05 to about 0.1 cm.

The granule-fiber mixture is fed to standard pressing dies where it is pressed into green compacts using a pressure of about 20 tons per square inch. The resultant green compacts have a diameter of about 0.4 inch and a height of about 0.5 inch. The green compacts are then heated to a temperature of about 750° C. in an atmosphere of about 80 volume percent steam and 20 volume percent hydrogen and held under these conditions for about 2 hours to remove the PVA. At the conclusion of this dewaxing step, examination shows that the wood cellulose fibers degrade under such conditions and are substantially totally removed, leaving interconnected void passageways throughout the compact. Subsequently, the dewaxed compacts are sintered at a temperature of about 1725° C. for 4 hours and are then slowly cooled. Examination of the sintered compacts shown that they have a density of about 10.2 g/cm³ (about 93.1 percent of theoretical) and that they are characterized by a predominantly open porosity, with tube-like pores having diameters in the range of about 14 microns to about 18 microns.

The sintered compacts are irradiated under reactor operating conditions, wherein the surface temperature of the compacts is at or above about 400° C. for a substantial length of time. Examination of the irradiated compacts shows no significant densification or shrinking occurs, and these sintered compacts are considered to be excellently suited for use as water reactor fuel.

Although certain preferred embodiments of the invention have been described hereinbefore, it should be understood that various modifications as would be obvious to one having the ordinary skill in this art may be made without deviating from the scope of this invention which is defined solely by the appended claims. Various features of the invention are set forth in the claims that follow.

What is claimed is:

1. A method of making an oxide nuclear fuel compact of predominantly open porosity, which method comprises forming a green compact from a mixture of particulate nuclear fuel oxide and fibrous material, said fibrous material constituting between about 5 and about 15 volume percent of said green compact, heating said green compact under conditions sufficient to cause removal of said fibrous material, and heating said compact to a sintering temperature for a sufficient length of time to sinter said particulate nuclear fuel oxide to a strong, open-pore structure having a density between about 88 and 96 percent of theoretical density, which sintered compact is resistant to in-reactor sintering.

2. A method in accordance with claim 1 wherein said sintering is carried out for a time-temperature interval within the region A depicted in FIG. 2 in an inert atmosphere.

3. A method in accordance with claim 1 wherein said nuclear fuel is selected from the group consisting of uranium oxide, plutonium oxide, thorium oxide and mixtures thereof.

4. A method in accordance with claim 1 wherein said fibrous material is organic material.

5. A method in accordance with claim 1 wherein said fibers have diameters between about 5 microns and about 2 mils.

6. A method in accordance with claim 5 wherein said fibers have a length of not more than about 10 percent of the shortest dimension of the compact which is formed.

7. A method in accordance with claim 1 wherein said mixture is pressed at between about 10 and about 40 tons per square inch.

8. A method in accordance with claim 1 wherein said particulate nuclear fuel oxide, a binder and at least part of said fibrous material are granulated to produce granules and said granules are pressed to form said green compact.

9. A method in accordance with claim 1 wherein said fibrous material is removed in an oxidizing atmosphere at a temperature between about 500° C. and 950° C. prior to heating to said sintering temperature.

* * * * *